(12) United States Patent
Tiwari

(10) Patent No.: US 8,977,227 B2
(45) Date of Patent: Mar. 10, 2015

(54) METHOD OF HANDLING SIGNALING IN CONGESTED CORE NETWORK

(75) Inventor: Kundan Tiwari, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 334 days.

(21) Appl. No.: 13/558,329

(22) Filed: Jul. 25, 2012

(65) Prior Publication Data

US 2013/0029631 A1  Jan. 31, 2013

Related U.S. Application Data

(60) Provisional application No. 61/511,548, filed on Jul. 26, 2011, provisional application No. 61/512,002, filed on Jul. 27, 2011.

(51) Int. Cl.
```
H04W 88/02     (2009.01)
H04W 4/22      (2009.01)
H04W 76/00     (2009.01)
```
(52) U.S. Cl.
CPC .............. *H04W 4/22* (2013.01); *H04W 76/007* (2013.01)
USPC ..................................................... 455/404.1

(58) Field of Classification Search
USPC ................... 455/404.1, 450, 451, 453, 452.1
See application file for complete search history.

(56) References Cited

U.S. PATENT DOCUMENTS

| | | | |
|---|---|---|---|
| 2010/0297979 A1* | 11/2010 | Watfa et al. | 455/404.1 |
| 2011/0171925 A1* | 7/2011 | Faccin et al. | 455/404.1 |
| 2011/0294458 A1* | 12/2011 | Tiwari | 455/404.1 |
| 2012/0002545 A1* | 1/2012 | Watfa et al. | 370/235 |

OTHER PUBLICATIONS

3GPP TS 24.301 V10.3.0 (Jun. 2011) Technical Specification 3rd Generation Partnership Project; Technical Specification Group Core Network and Terminals; Non-Access-Stratum (NAS) protocol for Evolved Packet System (EPS); Stage 3 (Release 10).

3GPP TS 23.401 V10.4.0 (Jun. 2011) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 10).

\* cited by examiner

*Primary Examiner* — Diane Mizrahi

(74) *Attorney, Agent, or Firm* — Winston Hsu; Scott Margo

(57) ABSTRACT

A method of handling signaling in a congested core network for a mobile device is disclosed. The method comprises initiating a first service request procedure for an emergency bearer service when a back-off timer is running on the mobile device; and not deactivating non-emergency Evolved Packet System (EPS) context locally and keeping the non-emergency EPS context during the first service request procedure for the emergency bearer service, wherein the non-emergency EPS context corresponds to user plane radio bearers which was not established, locally or with signaling.

7 Claims, 5 Drawing Sheets

METHOD OF HANDLING SIGNALING IN CONGESTED CORE NETWORK

CROSS REFERENCE TO RELATED APPLICATIONS

This application claims the benefit of U.S. Provisional Application No. 61/511,548, filed on Jul. 26, 2011 and entitled "Method to handle APN connection when network is congested", and the benefit of U.S. Provisional Application No. 61/512,002, filed on Jul. 27, 2011 and entitled "Method to handle APN connection when network is congested", the contents of which are incorporated herein in their entirety.

BACKGROUND OF THE INVENTION

1. Field of the Invention

The application relates to a method in a wireless communication system and related communication device, and more particularly, to method of handing signaling in a congested core network in a wireless communication system.

2. Description of the Prior Art

A long-term evolution (LTE) system supporting the 3GPP Rel-8 standard and/or the 3GPP Rel-9 standard is developed by the 3rd Generation Partnership Project (3GPP) as a successor of a universal mobile telecommunications system (UMTS), for further enhancing performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple evolved NBs (eNBs) for communicating with multiple user equipments (UEs), and communicates with a core network including a mobility management entity (MME), serving gateway, etc for Non Access Stratum (NAS) control. In UMTS system, a Serving GPRS Support Node (SGSN) is responsible for the delivery of data packets to the mobile devices back and forth within its geographical service area, including packet routing and transfer, mobility management (attach/detach and location management), logical link management, and authentication and charging functions. The MME also provides the control plane function for mobility between LTE and 2G/3G access networks with the S3 interface terminating at the MME from the SGSN.

NAS level congestion control contains the functions: "APN (access point name) based congestion control" and "General NAS level Mobility Management control". The use of the APN based congestion control is for avoiding and handling of EMM and ESM signaling congestion associated with UEs with a particular APN. With General NAS level Mobility Management control, the MME may also use the reject of NAS level Mobility Management signaling requests under general congestion conditions.

When the NAS level mobility management congestion control is applied due to network overload or congestion, the MME rejects an attach request, a tracking area update (TAU), a routing area update (RAU) or a service request, and the MME replies the UE with a Mobility Management back-off timer.

When congestion control is active, the MME/SGSN stores the Mobility Management back-off timer and the Session Management back-off timer. Then the MME/SGSN enforces the stored back-off time by immediately rejecting any subsequent request from the UE targeting at connecting to the APN before the stored back-off time is expired.

The purpose of a service request procedure is to transfer the EMM mode from EMM_IDLE to EMM_CONNECTED mode and establish the radio and S1 bearers when uplink user data or signaling is to be sent. Another purpose of this procedure is to invoke MO/MT CS fallback or 1xCS fallback procedures. The service request procedure is used when the following conditions occur:
- the network has downlink signalling pending;
- the UE has uplink signalling pending;
- the UE or the network has user data pending and the UE is in EMM-IDLE mode;
- the UE in EMM-IDLE or EMM-CONNECTED mode has requested to perform mobile originating/terminating CS fallback or 1xCS fallback;
- the network has downlink cdma2000® signalling pending; or
- the UE has uplink cdma2000® signalling pending.

During the service request procedure, the UE will deactivate the EPS bearer locally for which no user plane radio bearer is established. In the congestion case, the network will assign the emergency bearer when the UE initiates the service request procedure for emergency bearer services. However, the network will not be able to assign the user plane radio bearer for non-emergency EPS contexts. As a result, the UE will deactivate all the non-emergency bearer contexts. After the emergency call is finished the UE will try to detach and attach again to get the normal service after the back off timer expires. So the UE will create more signaling.

Further, during the service request procedure, the MME will try to activate the user plane radio bearers and S1 bearers for all active EPS context and send a request to eNB. Then, the eNB tries to allocate the user plane resources and when the eNB fails to allocate radio bearers to EPS context the MME will deactivate the corresponding EPS context locally. In the congestion scenario, when the UE has tries to make emergency call and there is not enough resource available, the eNB may not be able to assign resource to non-emergency EPS bearer. Hence, those EPS context will be deleted in the network and the UE. In the congestion and emergency situation, this increases unnecessary signaling and processing on the MME and eNB. The UE will be considered as attached for emergency bearer services and need to detach and attach again to get normal service, which increase more signaling after the back-off timer expires.

SUMMARY OF THE INVENTION

A method of handling singling in a congested core network for a mobile device is disclosed.

A method of handling singling in a congested core network for a mobile device is disclosed. The method comprises initiating a first service request procedure for an emergency bearer service when a back-off timer is running on the mobile device; and not deactivating non-emergency Evolved Packet System (EPS) context locally and keeping the non-emergency EPS context during the first service request procedure for the emergency bearer service, wherein the non-emergency EPS context corresponds to user plane radio bearers which was not established, locally or with signalling.

A method of handling singling in a congested core network for a network control node is disclosed. The method comprises receiving a service request for an emergency bearer service from a mobile device when a back-off timer is running on the mobile device; sending a request to a base station to allocate resource related to the emergency bearer service according to reception of the service request and not deactivating non-emergency EPS context which no resource is allocated to.

A method of handling singling in a congested core network for a network control node is disclosed. The method comprises receiving a service request from a mobile device for the emergency bearer service when a back-off timer is running on the mobile device; sending a request to a base station to allocate resource for all active EPS context according to reception of the service request; and not deactivating non-emergency EPS context which no resource is allocated to.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
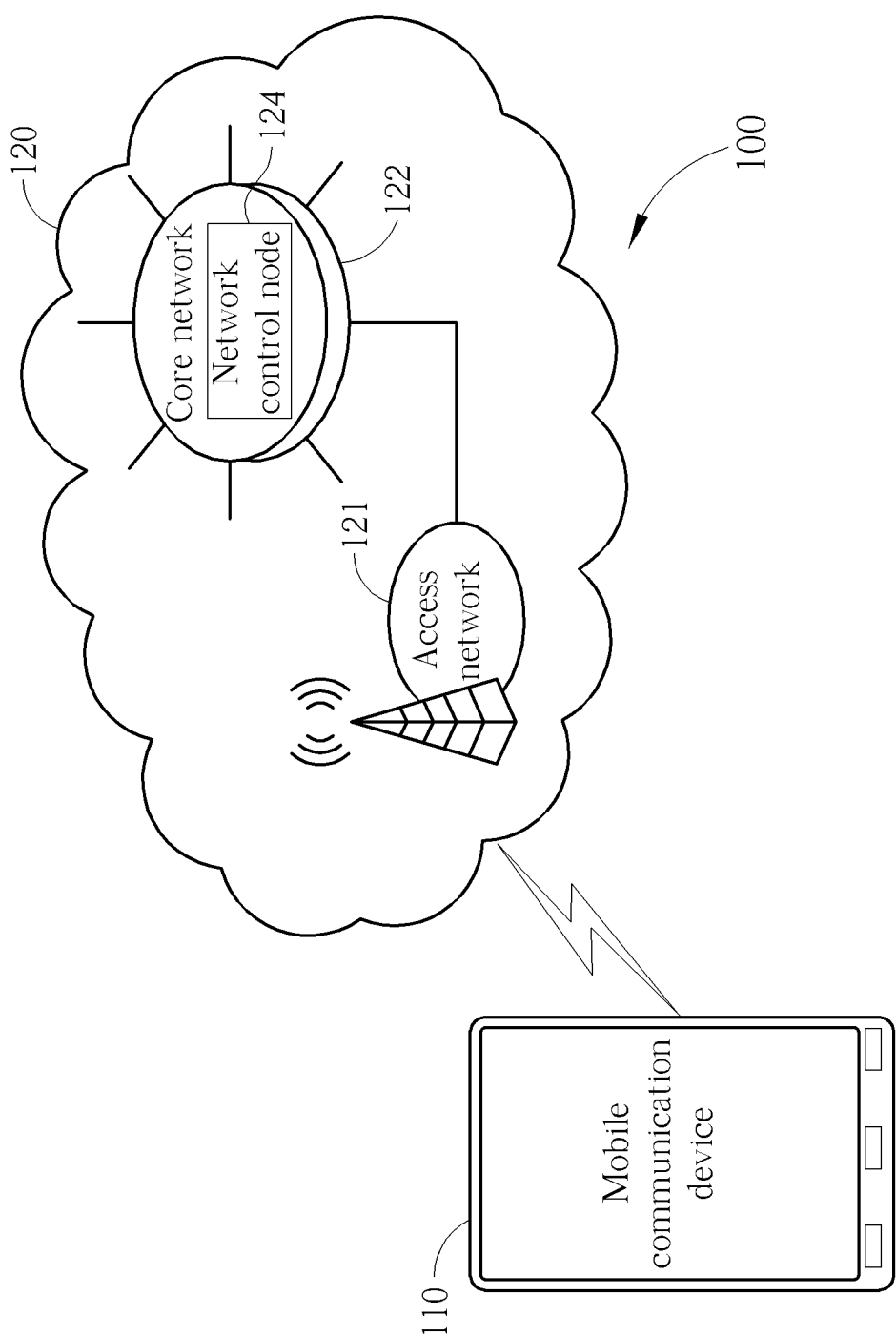
FIG. 1 is a block diagram illustrating an exemplary wireless communication system.

Please refer to FIG. 1, which is a block diagram illustrating an exemplary wireless communication system 100. In the wireless communication system 100, the mobile communication device 110 is wirelessly connected to the service network 120 for obtaining wireless services. The service network 120 comprises an access network (or called radio access network) 121 and a core network 122. The service network 120 may be a network in compliance with the Global System for Mobile Communication (GSM), Universal Mobile Telecommunications System (UMTS), or Evolved Packet System (EPS) technology. The access network 121 may be a GSM Edge Radio Access Network (GERAN) in the GSM technology, a UMTS Terrestrial Radio Access Network (UTRAN) in the WCDMA/HSPA technology, or an Evolved-UTRAN (E-UTRAN) in the LTE/LTE-Advanced technology, and the core network 122 may be a GSM core or General Packet Radio Service (GPRS) core in the GSM/UMTS system or an Evolved Packet Core (EPC) in the EPS system.

In LTE, the network control node 124 could be a mobility management entity (MME). The MME is responsible for the delivery of data packets to the mobile devices back and forth within its geographical service area, including packet routing and transfer, mobility management (attach/detach and tracking area management), session management (PDN connection establishment/disconnect), logical link management, and authentication and charging functions. The MME can also serve as a local mobility anchor for inter-working with other RATs (e.g. GSM and UMTS). In UMTS, the network control node 124 could be a Serving GPRS Support Node (SGSN). The SGSN is responsible for the delivery of data packets to the mobile devices back and forth within its geographical service area, including packet routing and transfer, mobility management (attach/detach and tracking area management), session management (PDP Context establishment/disconnect), logical link management, and authentication and charging functions. In GSM, the network control node 124 could be a Mobile Switching Center (MSC). The MSC is responsible for the delivery of voice service in circuit switch manner to the mobile devices back and forth within its geographical service area, including mobility management (attach/detach and location area management), logical link management, and authentication and charging functions. The mobile communication devices 110 can be devices such as mobile phones, computer systems, etc. Besides, the access network and the mobile communication devices 110 can be seen as a transmitter or receiver according to transmission direction, e.g., for uplink, the mobile communication device 110 is the transmitter and the network is the receiver, and for downlink, the network is the transmitter and the mobile communication device 110 is the receiver.

Figure 2:
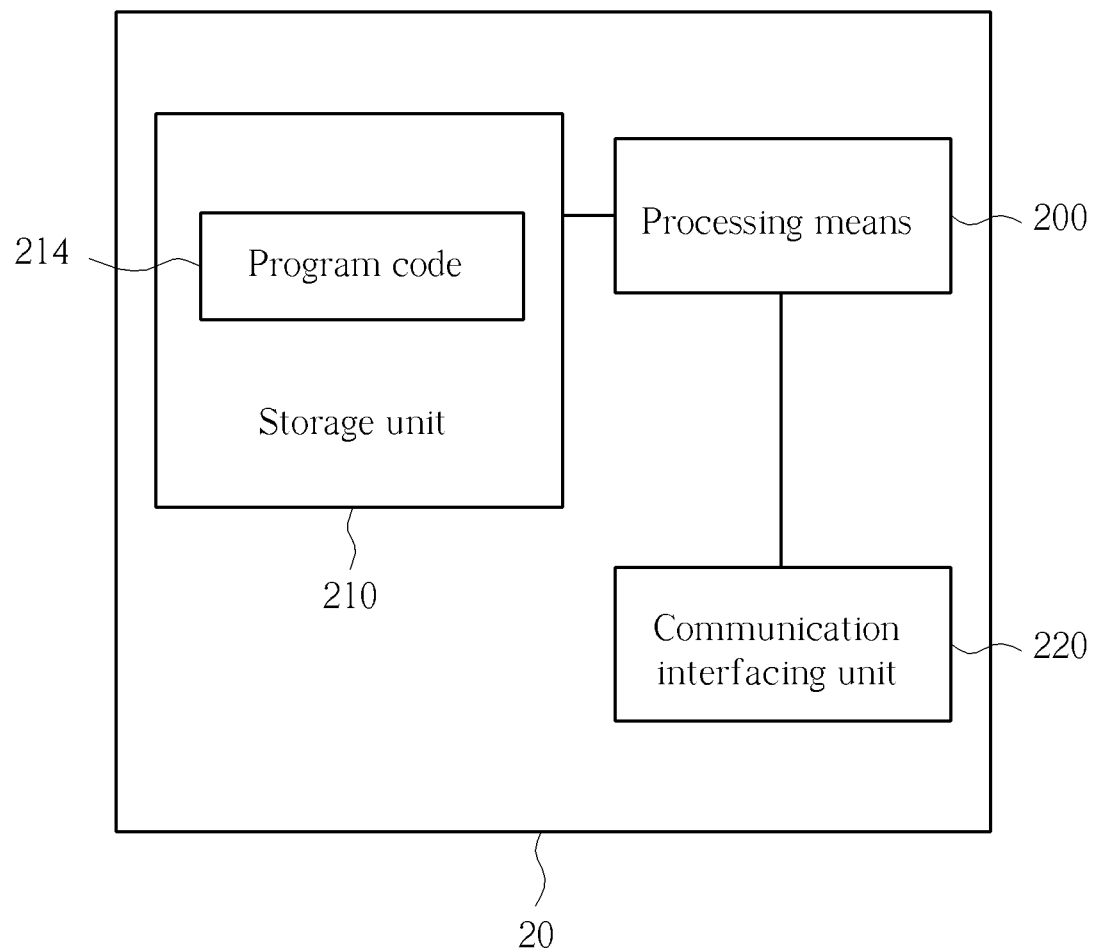
FIG. 2 is a schematic diagram of an exemplary communication device.

Please refer to FIG. 2, which is a schematic diagram of an exemplary communication device 20. The communication device 20 can be the mobile communication device 110, the network control node 124 or the core network 122 shown in FIG. 1, but is not limited herein. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, hard disk, and optical data storage device. The communication interfacing unit 220 is preferably a transceiver and can handle timer configuration according to processing results of the processor 200.

When the network control node 124 (e.g. MME/SGSN) performs NAS level congestion control, the network control node 124 stores a mobility back-off time (e.g. Management (MM) back-off time and a Session Management (SM) back-off time). When the NAS level mobility management congestion control is applied, the network control node 124 rejects a NAS request, such as an attach request, a tracking area update (TAU), a routing area update (RAU) or a service request, and replies the UE with a back-off timer.

When a NAS request is rejected, a back-off timer (e.g. EMM or GMM back-off timer) may be sent by the MME. While the back-off timer is running, the UE shall not initiate any NAS request except for service users, emergency services and mobile terminated services.

Figure 3:
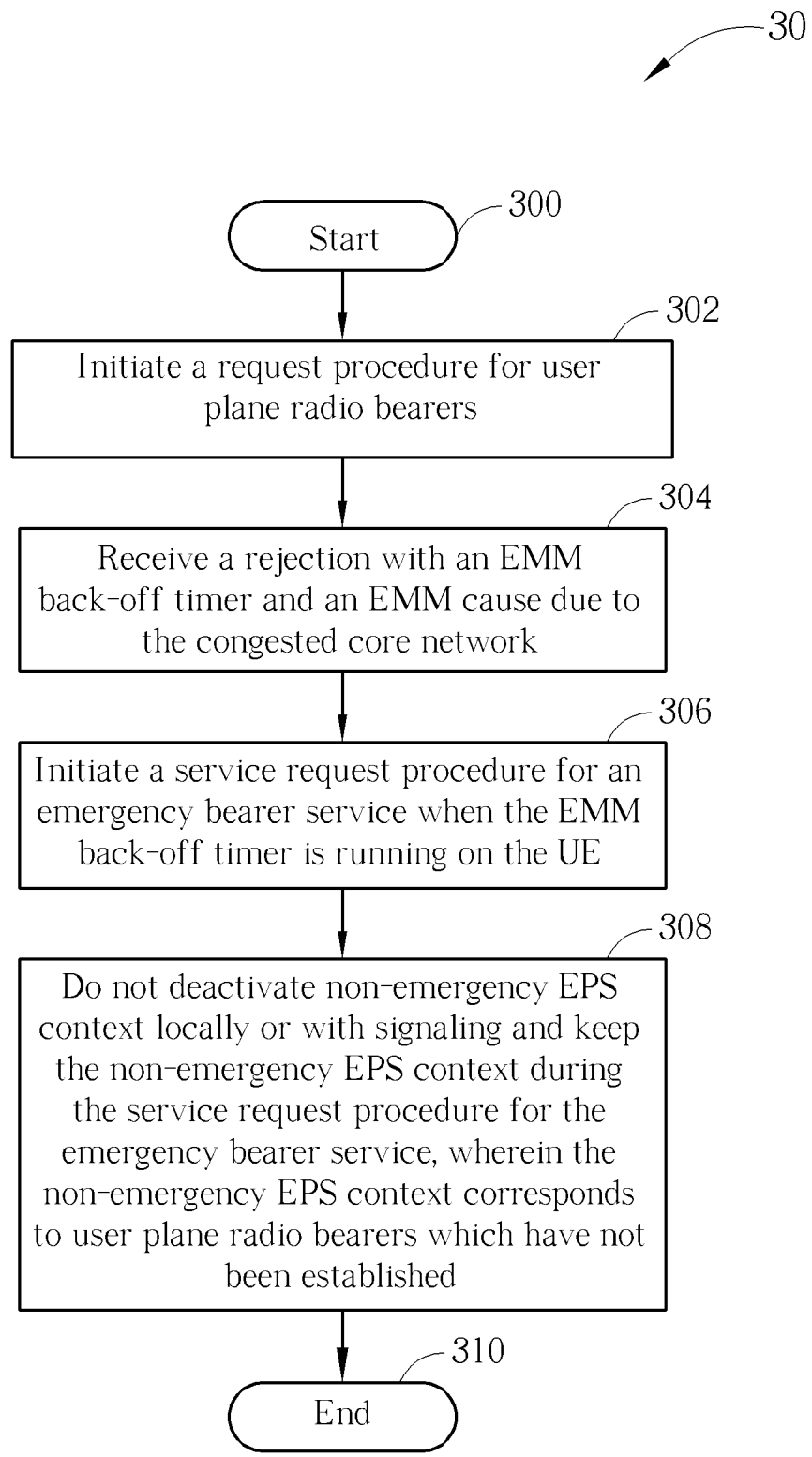
FIG. 3 is a flow chart of an exemplary process.

Please refer to FIG. 3, which is a flow chart of a process 30. The process 30 is used for handling signaling in a congested core network for a UE. The congested core network can be the core network 122, which include the network control node 124, e.g. MME/SGSN/MSC. The UE can be the mobile communication device 110 in FIG. 1. The process 30 may be complied in the program code 214 and includes the following steps:

Step 300: Start.
Step 302: Initiate a request procedure for user plane radio bearers.
Step 304: Receive a rejection with an EMM back-off timer and an EMM cause due to the congested core network.
Step 306: Initiate a service request procedure for an emergency bearer service when the EMM back-off timer is running on the UE.
Step 308: Do not deactivate non-emergency EPS context locally or with signaling and keep the non-emergency EPS context during the service request procedure for the emergency bearer service, wherein the non-emergency EPS context corresponds to user plane radio bearers which have not been established.
Step 310: End.

According to the process 30, when the core network 122 is congested, the request procedure for the user plane radio bearer is rejected with the EMM back-off timer and EMM cause value (e.g. EMM cause value #22). Preferably, the EMM back-off timer is referred to as a timer T3346. When the EMM back-off timer is still running, the UE initiates another service request procedure for the emergency service (e.g. emergency call) to get emergency EPS bearer context. During the service request procedure for the emergency service, the UE is not allowed to deactivate the non-emergency EPS context corresponding to the user plane radio bearers which have not been established, locally or with signaling. In other words, the UE does not detach and attach again after the EMM back-off timer expires. Instead, the UE keeps the non-emergency EPS context corresponding to the user plane radio bearers which have not been established during the service procedure for the emergency service. Since the UE does not detach and attach again, this can reduce signaling in the congested core network when the UE requests the normal service after the EMM back-off timer expires.

Figure 4:
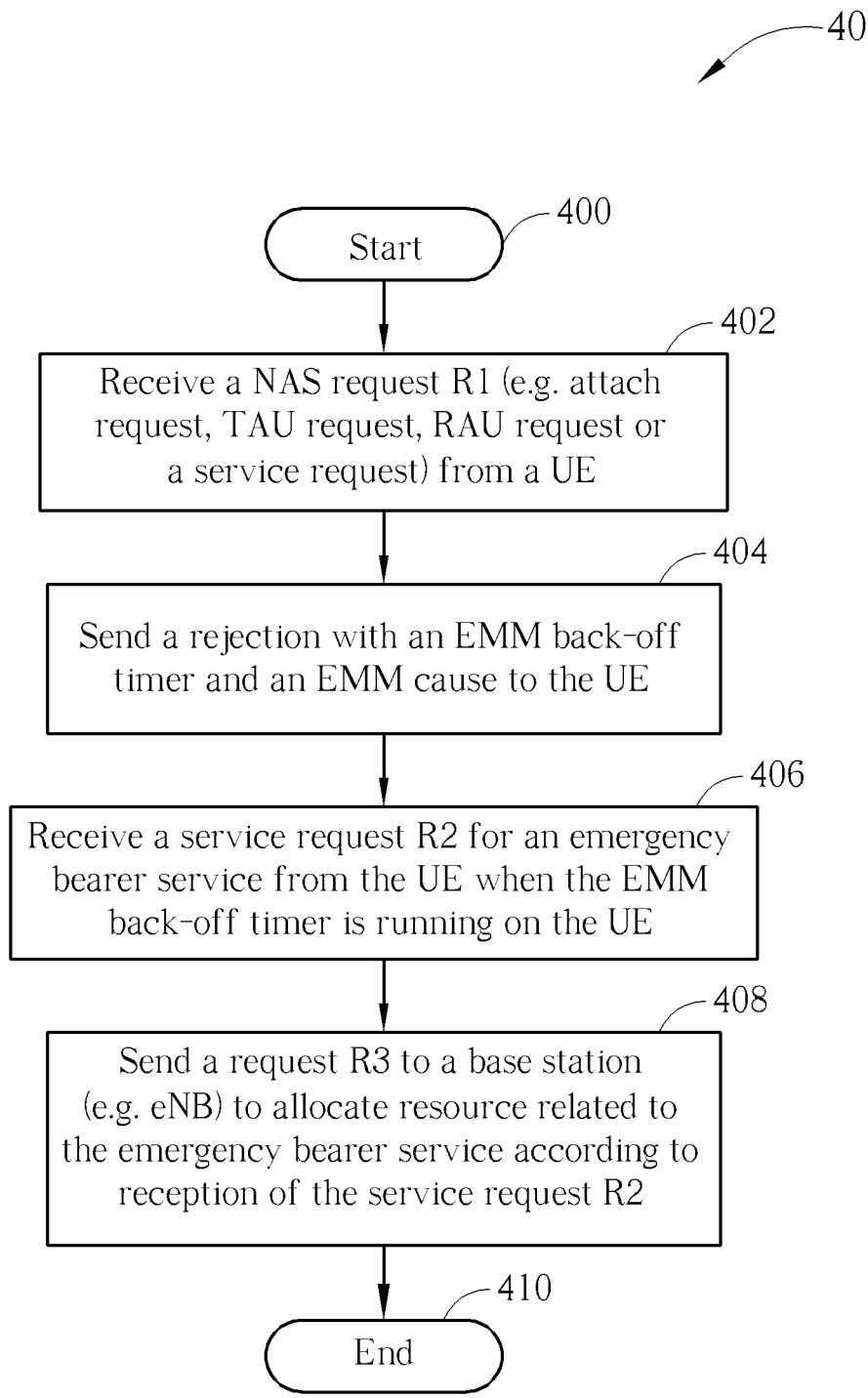
FIG. 4 is a flow chart of an exemplary process.

Please refer to FIG. 4, which is a flow chart of a process 40. The process 40 is used for handling signaling in a congested core network for a network control node. The congested core network can be the core network 122 and the network control node can be the network control node 124, e.g. MME/SGSN/MSC. The process 40 may be complied in the program code 214 and includes the following steps:

Step 400: Start.

Step 402: Receive a NAS request R1 (e.g. attach request, TAU request, RAU request or a service request) from a UE.

Step 404: Send a rejection with an EMM back-off timer and an EMM cause to the UE.

Step 406: Receive a service request R2 for an emergency bearer service from the UE when the EMM back-off timer is running on the UE.

Step 408: Send a request R3 to a base station (e.g. eNB) to allocate resource related to the emergency bearer service according to reception of the service request R2.

Step 410: End.

According to the process 40, when the core network 122 is congested, the network control node 124 rejects the NAS request R1 by sending the rejection with the EMM back-off timer and the EMM cause (e.g. EMM cause value #22). When the EMM back-off timer is running, the UE may send the service request R2 for the emergency bearer service. The network control node 124 receives the service request R2 and sends the request R3 to the eNB to allocate the resource related to the emergency bearer service according to reception of the service request R2. On the other hand, the base station allocates the resource related to the emergency bearer service to the UE when receiving the request R3. Preferably, the resource related to the emergency bearer service only includes radio bearers and S1-bearers of emergency EPS context. Namely, the network control node 124 allocates the radio bearers and S1-bearers of the emergency EPS context only to the base station. And the base station allocates the radio bearers and S1-bearers of emergency EPS context only to the UE.

In addition, the network control node 124 is not allowed to deactivate non-emergency EPS context which has no radio bearers and 51-bearers allocated to. The network control node 124 and the UE both keep the non-emergency EPS context active. Therefore, the singling in the congested core network can be reduced when the UE requests the normal service after the EMM back-off timer expires.

Figure 5:
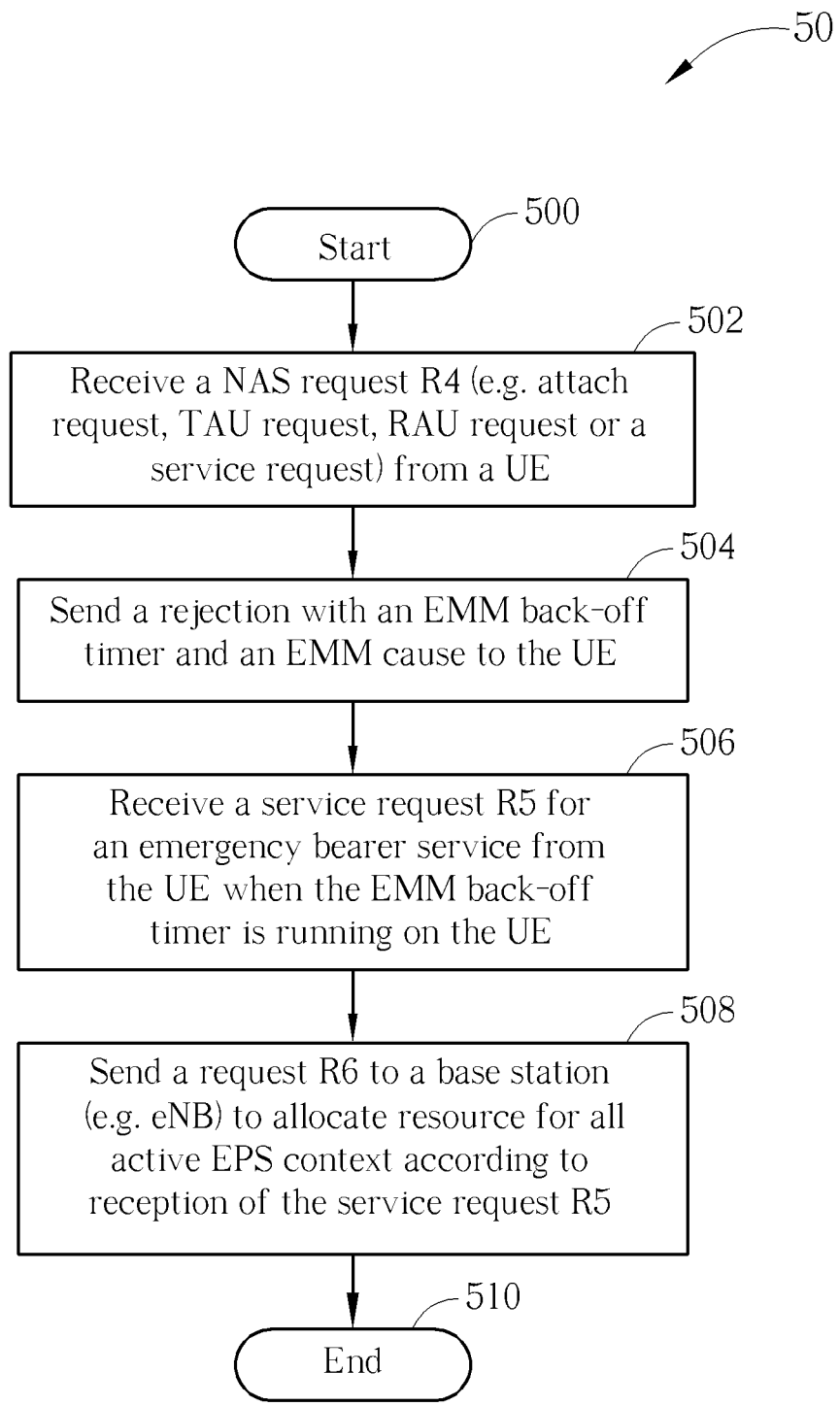
FIG. 5 is a flow chart of an exemplary process.

Please refer to FIG. 5, which is a flow chart of a process 50. The process 50 is used for handling signaling in a congested core network for a network control node. The congested core network can be the core network 122 and the network control node can be the network control node 124, e.g. MME/SGSN/MSC. The process 50 may be complied in the program code 214 and includes the following steps:

Step 500: Start.

Step 502: Receive a NAS request R4 (e.g. attach request, TAU request, RAU request or a service request) from a UE.

Step 504: Send a rejection with an EMM back-off timer and an EMM cause to the UE.

Step 506: Receive a service request R5 for an emergency bearer service from the UE when the EMM back-off timer is running on the UE.

Step 508: Send a request R6 to a base station (e.g. eNB) to allocate resource for all active EPS context according to reception of the service request R5.

Step 510: End.

According to the process 40, when the core network 122 is congested, the network control node 124 rejects the NAS request R4 by sending the rejection with the EMM back-off timer and the EMM cause (e.g. EMM cause value #22). When the EMM back-off timer is running, the UE may send the service request R5 for the emergency bearer service. The network control node 124 receives the service request R5 and sends the request R6 to the eNB to allocate the resource for all active EPS context according to reception of the service request R5. On the other hand, the base station allocates the resource for all active EPS context when receiving the request R3. Preferably, the resource includes radio bearers and S1-bearers for all active EPS context. Namely, the network control node 124 allocates the radio bearers and S1-bearers for all active EPS context to the base station. And the base station allocates the radio bearers and S1-bearers for all active EPS context to the UE.

In addition, the network control node 124 is not allowed to deactivate non-emergency EPS context which has no radio bearers and S1-bearers allocated to. The network control node 124 and the UE both keep the non-emergency EPS context active. Therefore, the singling in the congested core network can be reduced when the UE requests the normal service after the EMM back-off timer expires.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, When an EMM back off timer (e.g. T3346) is running and a UE initiates the service request procedure to get the emergency bearer services and user plane radio bearer for a non-emergency EPS context is not established during the service request procedure, the UE is not allowed to deactivate the EPS context corresponding the user plane radio bearer which was not established, locally or with signaling. Further, when the UE having active non-emergency context initiates service request procedure for an emergency bearer service and the network is congested, the MME sends a request to eNB to allocate the radio bearers and S-1 bearers of the emergency EPS context only or allocate the radio bearers and S-1 bearers for all active EPS context. Besides, the MME is not allowed to delete the active non-emergency EPS context. The MME and UE both keep the active non-emergency context.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling signaling in a congested core network for a mobile device, the method comprising:
   initiating, by the mobile device, a request message to the network;
   receiving, by the mobile device, a back-off timer and an EMM (EPS Mobility Management) cause value in a reject message due to the congested core network;
   initiating, by the mobile device, a first service request procedure for an emergency bearer service when the back-off timer is running on the mobile device; and
   not deactivating, by the mobile device, non-emergency Evolved Packet System (EPS) context and keeping the non-emergency EPS context during the first service request procedure for the emergency bearer service, wherein the non-emergency EPS context corresponds to user plane radio bearers which was not established, locally or with signaling.

2. The method of claim 1, wherein the back off timer is an EMM back off timer and the back-off timer starts due to the congested core network.

3. A method of handling singling in a congested core network for a network control node, the method comprising:
   receiving a request message from a mobile device;
   sending a back-off timer and an EMM (EPS Mobility Management) cause value in a reject message to the mobile device due to the congested core network;
   receiving a service request for an emergency bearer service from the mobile device when the back-off timer is running on the mobile device;
   sending a request to a base station to allocate resource related to the emergency bearer service according to reception of the service request; and
   not deactivating non-emergency EPS context which no resource is allocated to.

4. The method of claim 3, wherein the resource related to the emergency bearer service comprise radio bearers and S1-bearers of emergency EPS context.

5. The method of claim 3, wherein the base station allocates the resource related to the emergency bearer service to the mobile device when receiving the request.

6. A method of handling singling in a congested core network for a network control node, the method comprising:
   receiving a request message from a mobile device;
   sending a back-off timer and an EMM (EPS Mobility Management) cause value in a reject message to the mobile device due to the congested core network;
   receiving a service request from the mobile device for the emergency bearer service when the back-off timer is running on the mobile device;
   sending a request to a base station to allocate resource for all active EPS context according to reception of the service request; and
   not deactivating non-emergency EPS context which no resource is allocated to.

7. The method of claim 6, wherein the resource comprise radio bearers and S1-bearers.

* * * * *